UNITED STATES PATENT OFFICE.

THOMAS E. RICE, OF DES MOINES, IOWA.

GASOLENE SUBSTITUTE.

1,230,924.

Specification of Letters Patent.  Patented June 26, 1917.

No Drawing.    Application filed May 13, 1916.  Serial No. 97,330.

*To all whom it may concern:*

Be it known that I, THOMAS E. RICE, a citizen of the United States, residing at Des Moines, in the county of Polk and State of Iowa, have invented new and useful Improvements in Gasolene Substitutes, of which the following is a specification.

The object of my present invention is the production of a liquid fuel, suitable for use as a substitute for gasolene, for example in gasolene engines, such as automobile engines or the like.

The invention also comprises the production of a fuel which shall be in many respects superior to gasolene, economical to manufacture, and free from the objections inherent in most of the mixtures heretofore proposed, for use as substitutes for gasolene.

It has heretofore been proposed to mix kerosene with other liquid materials more volatile than kerosene, but the objection in practice to most of such mixtures is that they are prone to knocking, or they are difficult to handle, on account of difficulty experienced in starting the engine particularly in cold weather. With my fuel, however, I can start the engine in cold weather just as quickly, or more quickly than with good grade of gasolene. In ordinary weather, the engine starts with my improved fuel, much better than with ordinary gasolene.

The fuel is preferably composed of the following ingredients, in about the proportions stated, or the proportions may be varied more or less, depending upon the specific gravity of the kerosene employed and other factors.

Kerosene (gravity .8,) _____ 1 gallon
Dimethyl oxid _____ 4 ounces
Carbon disulfid _____ 8 ounces While dimethyl oxid is not very soluble in kerosene alone, it is found to be readily soluble in a mixture of kerosene and carbon disulfid in substantially the proportions as stated above.

It has been heretofore proposed to employ sulfuric ether in admixture with kerosene, but such mixture was found to be open to certain objections. The mixture of kerosene, dimethyl ether and carbon disulfid is found to be a material improvement in this art, over all the gasolene substitutes containing ether with which I am familiar. The mixture is also found to be materially better than a mixture of sulfuric ether, kerosene and carbon disulfid, in that the latter is open to several objections, namely there is a considerable tendency toward separation of the mixture into two fractions, one of which contains substantially all the ether of the mixture, while the other contains substantially all of the kerosene, the carbon disulfid being contained in part in the upper layer, and in part in the lower layer. The mixture of carbon disulfid, ethyl ether and kerosene also possesses very poor volatility, so that it is very uncertain for starting, particularly in cold weather. Such a material also produces materially more "knocking" than does the mixture made according to my invention. Di-ethyl ether is also not capable of being dissolved in the mixture of kerosene and carbon disulfid, to the same extent as is dimethyl ether. The dimethyl ether is much cheaper and can be prepared very much easier.

What I claim is:

1. A liquid fuel suitable for use in internal combustion engines comprising kerosene, dimethyl oxid, and carbon disulfid.

2. A liquid fuel for use in internal combustion engines comprising:

Kerosene, _____ One gallon
Dimethyl oxid _____ Four ounces
Carbon disulfid _____ Eight ounces.

In testimony whereof I affix my signature.

THOMAS E. RICE.